United States Patent [19]

Albrecht

[11] 3,967,733

[45] July 6, 1976

[54] TAPE REEL HANGER

[75] Inventor: Leonard N. Albrecht, Beverly Hills, Calif.

[73] Assignee: Tab Products Company, Palo Alto, Calif.

[22] Filed: May 8, 1974

[21] Appl. No.: 467,863

[52] U.S. Cl. ............................... 211/113; 211/40; 248/214
[51] Int. Cl.² .......................................... A47F 5/08
[58] Field of Search ................ 211/13, 40, 71, 113, 211/94, 162; 248/223–225, 298, 214; 206/403–406; 312/8–10, 12, 14, 20

[56] References Cited
UNITED STATES PATENTS

| | | | |
|---|---|---|---|
| 2,291,966 | 8/1942 | Joseph | 248/298 |
| 3,051,318 | 8/1962 | Murphy | 211/94 |
| 3,134,132 | 5/1964 | Graber | 248/223 |
| 3,298,530 | 1/1967 | Clouthier | 312/20 |
| 3,310,178 | 3/1967 | Wright | 211/40 |
| 3,323,847 | 6/1967 | Clouthier | 211/13 |
| 3,477,584 | 11/1969 | Maslow et al. | 211/40 |
| 3,507,082 | 4/1970 | Heirch | 248/223 |
| 3,552,708 | 1/1971 | Hillstrom | 248/223 |
| 3,638,800 | 2/1972 | Frederick et al. | 312/9 |
| 3,753,216 | 8/1973 | Johnson et al. | 339/198 GA |

FOREIGN PATENTS OR APPLICATIONS

| | | | |
|---|---|---|---|
| 244,297 | 12/1965 | Austria | 211/162 |
| 460,281 | 9/1968 | Switzerland | 211/49 R |
| 829,229 | 3/1960 | United Kingdom | 312/20 |

*Primary Examiner*—Lawrence J. Staab

[57] ABSTRACT

This invention relates to equipment for hanging reels of magnetic computer tape and the like. The computer tape is usually enclosed in a canister having a peripheral hook. A rack is provided having a plurality of tapes. Each hanger has a suspension rod for receiving the hook of the canister. The hanger also includes a cantilevered spring member which acts to limit swinging of the tape canister and which aids in extracting a tape from the rack. To extract a tape the canister is pressed back to deflect the spring member and then released. The reaction of the spring member will cause the tape to swing forward to a position such that it can be readily grasped by hand.

6 Claims, 23 Drawing Figures

TAPE REEL HANGER

Magnetic computer tape is stored on reels. Customarily it is kept in storage in a form permitting ready access for removing the reels of tape when needed and storing them when not in use. One type of magnetic tape reel storage is a suspended or hanging type wherein the reel is enclosed in a canister or is provided with a circumferential seal and the canister or seal is provided with a peripheral hook by which the reel and its container (canister or seal) is hung from a suitable rack.

In storage equipment of this sort it is desirable to provide economy, easy access for insertion and removal of reels and means for coding or indexing the reels so that they can be located upon demand and can be refiled in the proper positions. Further, such equipment should be simple in its operation and it should be capable of housing tape reels and their containers which are of different widths.

It is an object of the present invention to provide improvements in magnetic tape reel storage equipment of this type. (It will be recognized from the ensuing description that the equipment of the present invention is also suited for storage of micro-film, cinema film, audio visual film, airfeed cartridges and other articles of like nature).

It is a further and particular object of the present invention to provide hanging equipment for tape reels and the like which is simple in its design, inexpensive to construct, easy to install and to use and capable of hanging reels of varying widths contained in canisters, tape seals, cartridges or the like which are also of varying widths.

The above and other objects of the invention will be apparent from the ensuing description and the appended claims.

Certain embodiments of the invention are illustrated by way of example in the accompanying drawings in which:

FIG. 4B is a view and end elevation of one of the channels;

Figures 1, 3A:
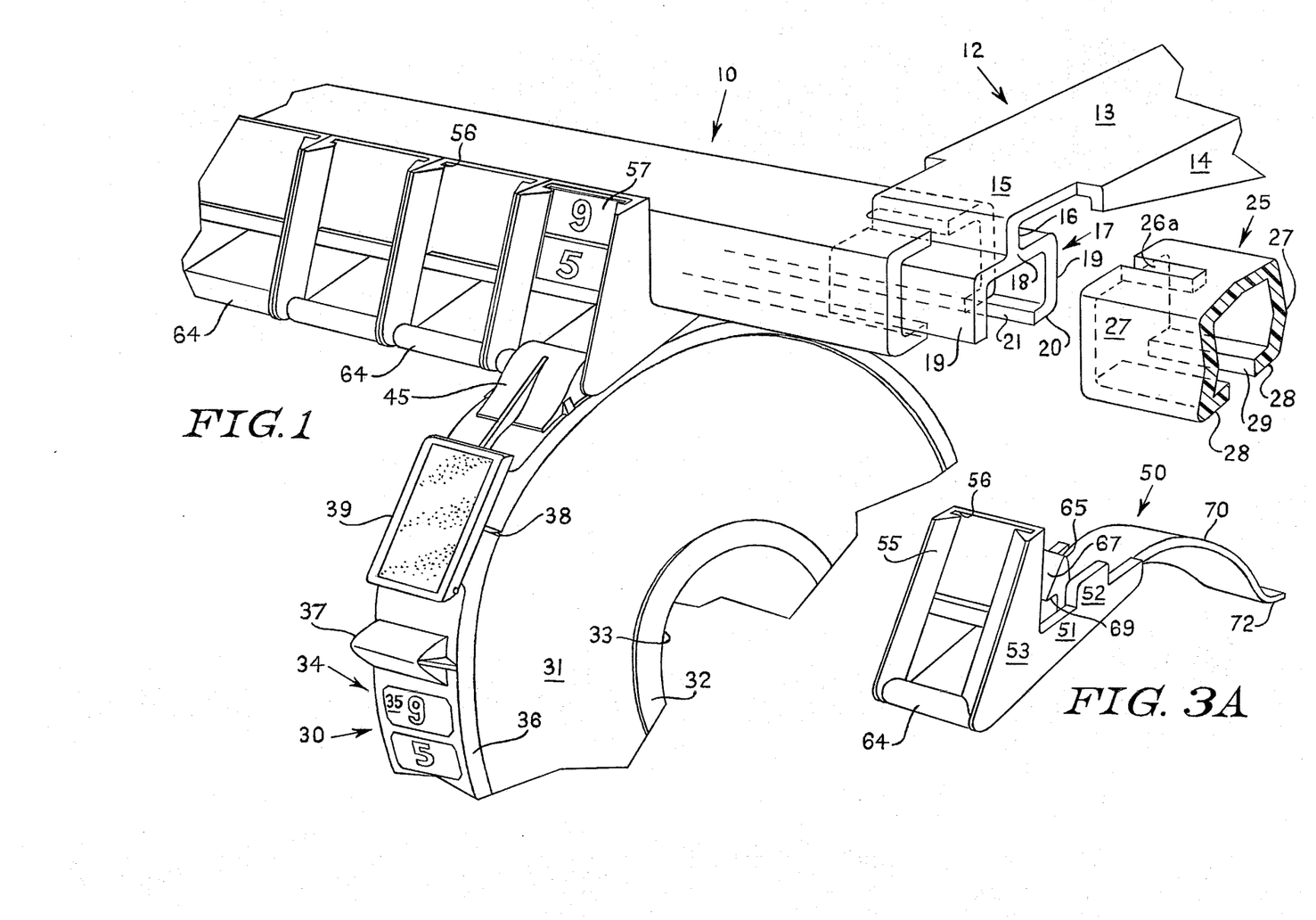
FIG. 1 is a fragmentary perspective view showing a structure including the preferred hanger element of the present invention and showing a magnetic tape reel suspended from the hanger.
FIG. 3A, 3B and 3C are, respectively, a front perspective view, a rear perspective view and a side elevational view of the preferred hanger element of the invention.
Figures 2, 3B, 3C, 4, 4A:
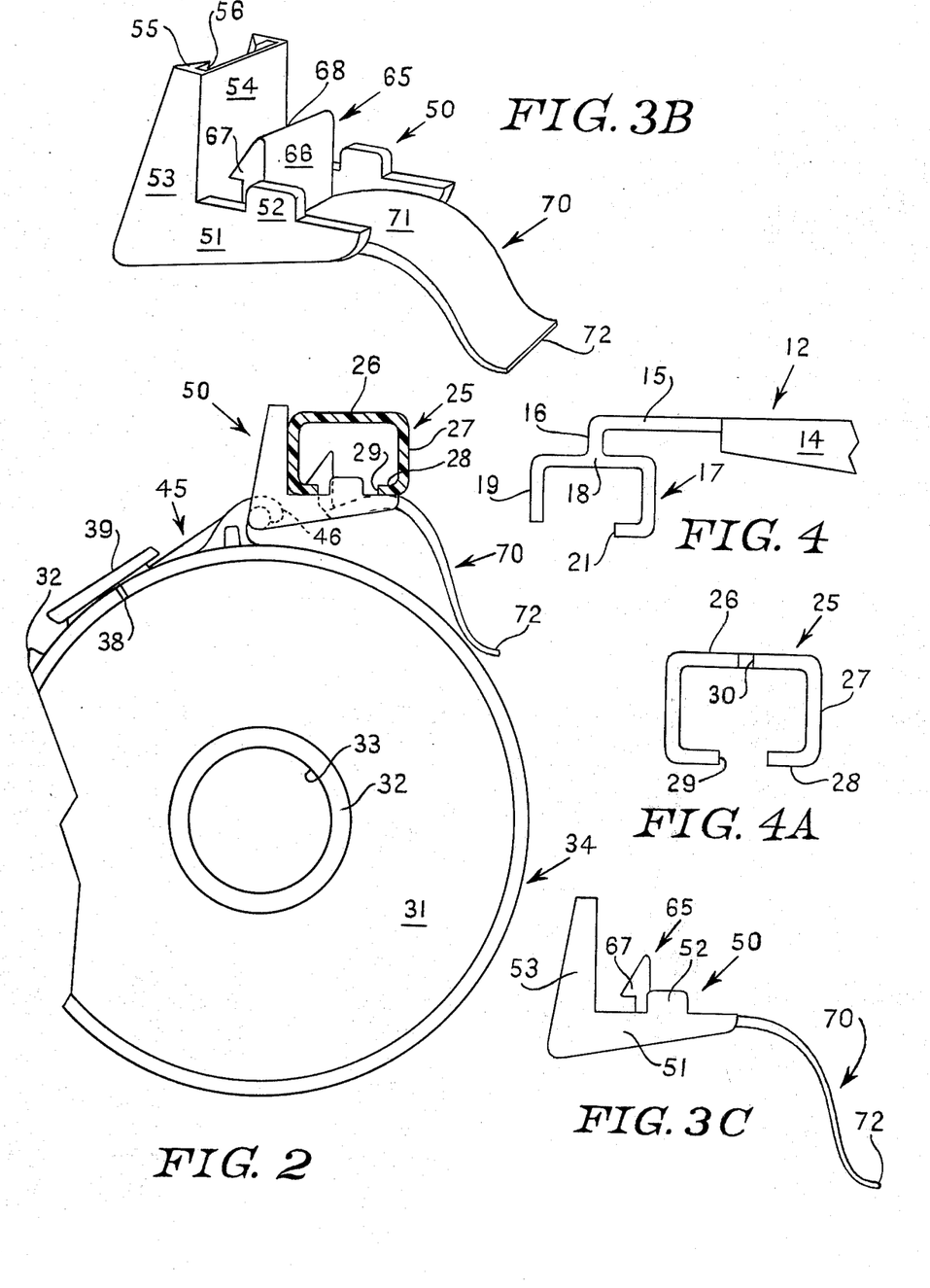
FIG. 2 is a view in side elevation of the tape reel as shown in FIG. 1 but with parts of the hanging structure omitted except for the channel on which the individual hanger elements are shown.
FIG. 4 is a fragmentary side elevational view of the cantilever arm which is shown in perspective in FIG. 1 and is employed to support the channels for the individual hangers.

Referring now to the drawings and preliminarily to FIGS. 1 and 2 an assembly 10 is shown supported by a cantilever arm or bracket 12 the inner end of which (not shown) is supported in any desired manner, for example, directly from a wall but preferably from a readily mountable-demountable structure such as that described in U.S. Pat. No. 3,031,088. A plurality of such cantilever arms will be employed which are spaced at suitable intervals in accordance with the length of the structure 10. The arm 12 is shown as having a web 13 and side flanges 14 for stiffening purposes and also as having a forward extension 15 which is turned down at 16 to provide a tongue which is integral with a channel member or connector bracket 17. The bracket 17 has an upper portion 18, side portions 19 and an inwardly and forwardly extending flange 20 spaced from the front portion 19 to provide a slot 21. A beam 25 is provided for the individual hanger elements which is in the form of a channel having a top portion 26, side portions 27 and inwardly extending flanges 28 which are spaced apart to provide a slot 29. At each end each channel 25 is formed with a slot 26a. It will be apparent that adjoining channels 25 can be butted one against the other so that, in effect, a single continuous beam is provided which extends the length of the structure and without any loss of space at junctions. (In another form, not shown, the channel 25 may be a continuous member which is welded to cantilever side members corresponding to the members 12. The construction shown in FIG. 1 wherein two channels 25 are joined is advantageous where a very long row of tape reels is hung).

A magnetic tape reel 30 is shown with a circumferential strap or seal rather than a canister. As explained above, the invention is equally applicable to tape reels which are enclosed in canisters and cartridges equipped with hooks. The reel 30 comprises side plates 31, and a hub 32 having a central opening 33 for fitting on the spindle of a tape drive. Secured to the periphery of the reel is the aforesaid circumferential tape seal 34 which comprises a body portion 35 and flanges 36. As is well known, such circumferential tape seals often have a grooved interior which fits over the side plates (such as shown at 31) of the reel. A safety projection acts to prevent or lessen the likelihood of accidental release of the reel.

The seal 34 is split and has adjoining ends at 38 and a latch 39 which may be of any of several known types for latching the seal in closed position as shown and for unlatching it and permitting a separation of the ends 38 for removal of the reel. Affixed to the tape seal 34 is a hook 45 which, as shown in FIG. 2, has a curved end portion 46 for suspending it from a hanger, which will now be described. The hook 45 may be molded integrally with the seal 34 (which is normally of molded plastic construction) or it may be added on as by heat sealing, riveting or by snap on means, etc.

The preferred hanger is generally designated by the reference numeral 50. It is preferably molded integrally e.g. of a plastic such as polypropylene, and it comprises side members or wings 51 having upwardly extending locking brackets 52 to prevent the hanger from being pulled forward and it also comprises a pair of spaced upwardly projecting wings 53 joined by a web 54. The wings 53 extend inwardly at 55 and are spaced from the web 54 to provide a slot 56 into which coding, indexing or the like can be inserted such as that shown at 57 in FIG. 1. Similarly the tape seal 34 will be provided with corresponding indexing or coding shown at 57a, in FIG. 1, such that each reel will have a definite position on the structure from which it is taken and to which it is restored. The indexing may be numeric, alphabetic or color coding or a combination of such codings. The hanger 50 is provided with a suspension rod 64 between the lower ends of the wings 55 and it is also provided with a lock member 65 having an upright body portion 66 and a sloping cam surface 67 sloping upwardly to a rounded tip 68 and having at its lower end a horizontal shoulder 69. Further, the hanger has a rearwardly extending resilient member or spring 70 which curves downwardly and terminates in an upwardly curved tip 72.

Having reference primarily to FIG. 2 the hanger 50 is inserted in the channel 25 as follows: It is brought up from below with the cam surface 67 bearing against the exposed edge of the forward lip 28 of the channel 25. As manual pressure is applied in an upward direction the cam surface 67 will cause the lock member 65 to flex to the right (as viewed in FIG. 2) so that the lower edge of the cam surface will clear the lip 28 and the lock member will be allowed to pass up through the slot 29 at which moment the lock member will snap back to its normal upright position and the shoulder 69 will overlie the upper surface of the forward lip 28, thereby securely locking the hanger in place. To remove the hanger 50, as for example to replace a damaged hanger by a new intact hanger, or to replace hanger for a tape reel of greater width, one will reach up through the slot 29 and manually, e.g. with a simple tool such as a screw driver, will flex the lock member 65 backwards to the right as viewed in FIG. 2 to disengage the shoulder 69 from the forward lip 28 and the hanger will then be withdrawn.

In use, when a hanger is inserted and located as described above, and is in the position shown in FIG. 2, a reel structure 30 will be suspended from the rod 64 by means of its hook 45 as shown in FIGS. 1 and 2. The function of the spring member 70 is multiple. Thus oftentimes a reel will be suspended as described above and upon release it will swing back and forth. The spring member 70 will act as a damping structure to limit such swinging movement but nevertheless, it will provide a yielding force so that if the reel is released from a forward position and swings back, it does not strike a rigid surface which might damage the reel structure. Further, if it is desired to extract the reel from the structure, it can be given a gentle push toward the rear, which will cause a deflection of the spring member 70. When the reel is released the reaction of the spring member will cause the reel to swing forward to a position such that it can be readily grasped by hand. Alternatively, the reels on either side of the reel that is to be removed may be pushed back against their springs to expose the reel which is to be removed and to make it accessible for gripping by hand. As the reels hang from this structure they contact only the rods 64 and the tips 72 of springs 70.

Spring members have been provided heretofore for this purpose but for the most part they have been in the form of a single spring structure running the entire length or a substantial portion of the length of the assembly. That is, these prior structures do not provide an individual spring for each reel. The individual spring structures shown in the drawings have the advantage that each acts only on its particular reel and independently of the other springs. If one of the springs 70 is damaged the entire hanger 50 can be replaced by a new hanger, whereas in the prior structures referred to above a damaged spring acting on many reels must be replaced in its entirety.

Figure 5:
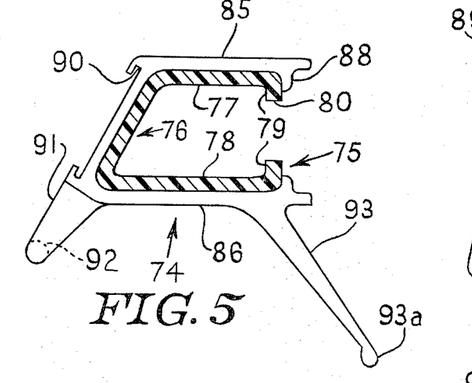
FIG. 5 is a view in side elevation of a modified form of hanger shown mounted on an appropriate channel.
Figure 5A:
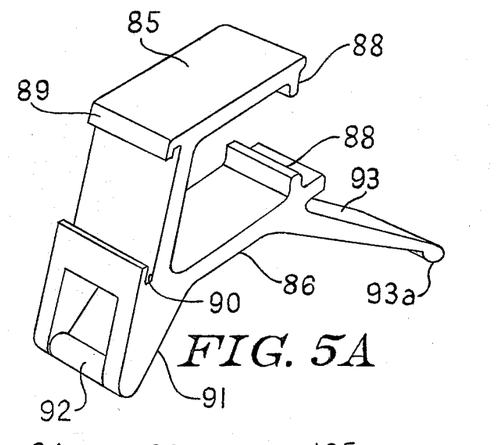
FIG. 5A is a perspective of the same hanger without the channel.

Referring now to FIGS. 5 and 5A, another embodiment is there shown, the hanger being generally designated by the reference numeral 74 and the modified channel suited for this hanger by the reference numeral 75. The channel 75, as will be seen, comprises a sloping front portion 76, top and bottom portions 77 and 78 and vertical lip portions 79 spaced apart to provide a slot 80. The hanger 74 has a body portion formed by top and bottom portions 85 and 86, a sloping front portion 87 and lips 88 to the rear. The front portion 87 is formed with extensions 89 which provide grooves 90 into which coding or indexing can be inserted as in the case of the hanger 50 of FIGS. 1 and 2. Downward extensions 91 are provided between which is a rod or bar 92 from which the tape reel is suspended. A rear spring member 93 is provided terminating in a rounded tip 93a which serves the same purpose as the spring member 70 of hanger 50. As will be seen from FIG. 5, the hanger 74 is mounted on its channel 75 by springing apart the upper and lower portions 85 and 86 sufficiently to allow the lips 88 to clear the upper and lower portions 77 and 78 of the beam. Alternatively, if access is available to an end of the beam, the hanger 74 may be inserted from an end without the need to spread the parts of the hanger far apart.

Figure 6:
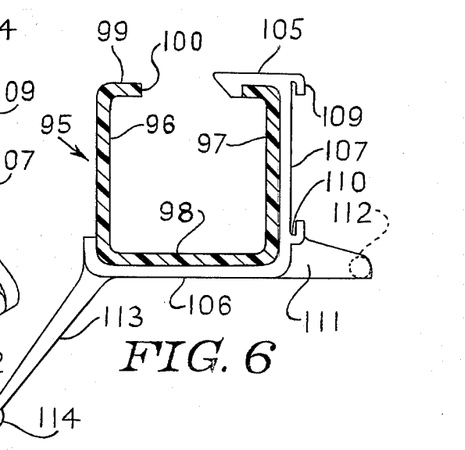
FIGS. 6 and 6A, 7 and 7A, 8 and 8A, 9 and 9A, 10 and 10A, and 11 and 11A are similar pairs of views each showing in one of the views (FIGS. 5, 6 etc.) a view in side elevation of a particular form of hanger mounted on a channel (a tube in FIG. 11) and in the other member of each pair of views (FIGS. 5A, 6A, etc.) perspective views of the respective hangers.
Figure 6A:
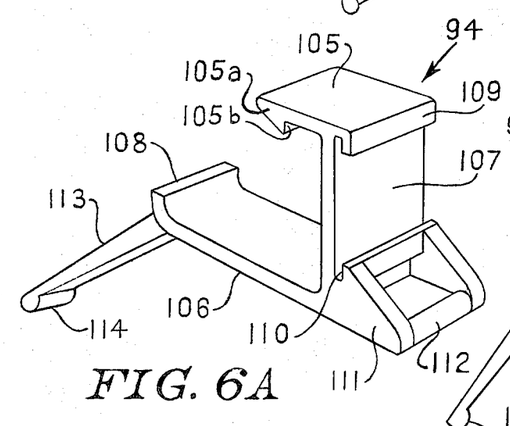

Referring now to FIGS. 6 and 6A, still another form of hanger is there shown which is generally designated by the reference numeral 94 and is shown mounted on a channel 95. The channel 95 is formed as an upright channel having side members 96 and 97, bottom portion 98 and inwardly projecting lips 99 spaced apart to provide a slot 100. The hanger has a body portion formed with top and bottom portions 105 and 106, a front portion 107 and a rear lip 108. The front portion 107 is formed with extensions 109 which provide grooves 110 within which indexing means can be located. Forward extensions 111 are provided which are connected by member 112 which serves as a rod for suspension of a tape reel. A spring member 113 terminating in a bead 114 is also provided. The hanger 94 is mounted on the channel 95 by means which will be apparent from an inspection of FIG. 6. Thus, the front portion is sprung back manually so that the lip 105a will clear the front lip 99 of beam 95 and the hanger is pushed forward until the lip 105a snaps over the adjacent lip 99. Alternatively, as in the case of the hanger 74 of FIGS. 5 and 5A, if access to an end of the channel is available the hanger may be slipped over an end and shifted to the desired position along the beam.

Figure 7:
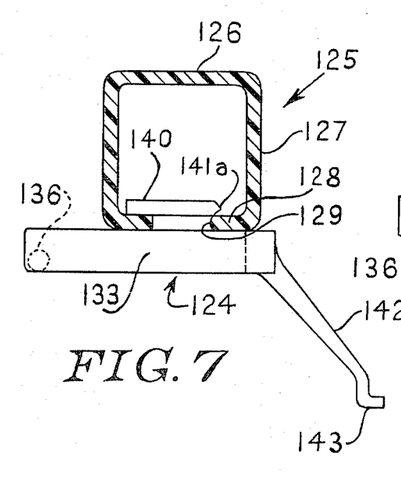
Figure 7A:
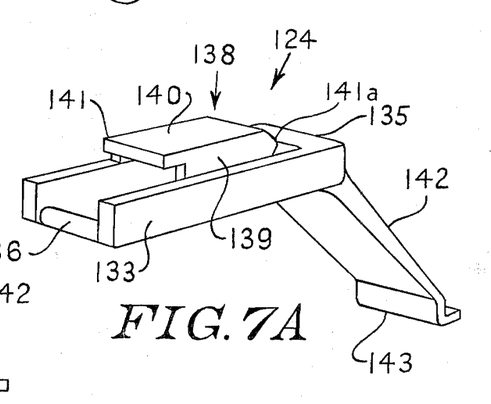

Referring now to FIGS. 7 and 7A, a simpler type of hanger is provided which does not support indexing means. This hanger is generally designated by the reference numeral 124 and it is suspended from a channel 125. The channel 125 is a simple channel structure having a top portion 126 front and rear portion 127 and inwardly extending lips 128 spaced apart to provide a slot 129. The hanger 124 comprises side portions 133, a rear portion 135 and a rod 136 extending between the forward ends of the side portions 133 to provide means for hanging a tape reel. A locking mechanism 138 is provided having side walls 139, a top portion 140 and a forwardly projecting tongue 141 and a rearward projection 141a. A spring member 142, terminating in a tip 143 is also provided. The hanger 124 may be inserted by canting it in relation to the channel 129 and then straightening it out or it may be inserted from the end of a channel. This hanger is sufficiently inexpensive that, when it is desired to remove it from the channel, for example, when it is worn out or broken, this can be accomplished merely by pulling down on spring 142 to deflect or break the projection 141a. Then the hanger is detached from the channel, is discarded and is replaced.

Figure 8:
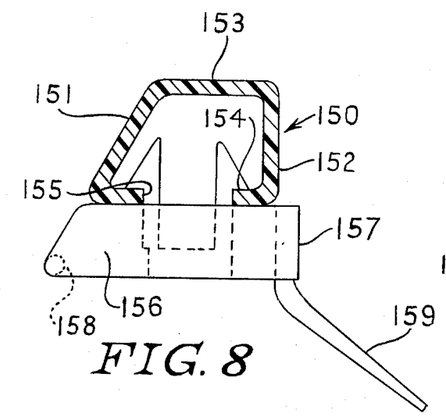
Figure 8A:
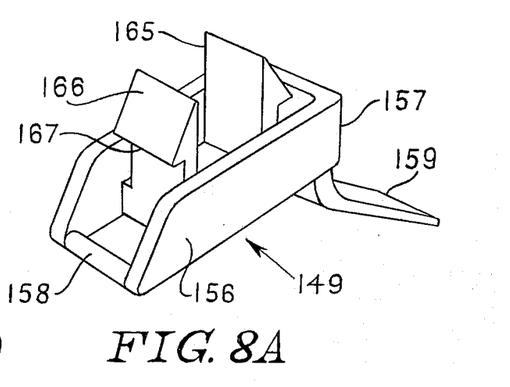

Referring now to FIGS. 8 and 8A a hanger 149 is shown suspended from a channel 150. The channel 150 has a sloping forward portion 151, a vertical rear portion 152, a top portion 153 and inwardly projecting lips 154 spaced apart to provide a slot 155. The hanger 149 comprises side portions 156, a rear portion 157 and a rod 158 connecting the forward ends of the side portions 156 and providing a means for hanging a tape reel. A spring member 159 is provided at the rear. A locking mechanism is provided by two opposed members 165 each of which has a sloping cam portion 166 terminating in a shoulder 167. The manner in which the hanger 149 is locked in the beam 50 will be apparent from an inspection of FIG. 8. Thus the tips of the lock members 165 are held beneath and in registry with the slot 155 in the channel 150 and the hanger is pushed upwardly. The cam surfaces 166 act to flex the members 165 inwardly, so that they will clear the sides of the slot 155 until the cam portions 166 are in position to snap back, at which time the shoulders 167 will assume the positions as shown in FIG. 8.

Figure 9:
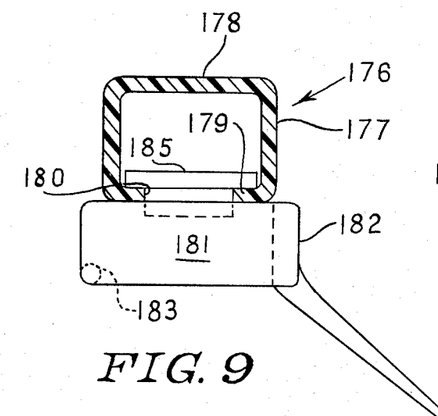
Figure 9A:
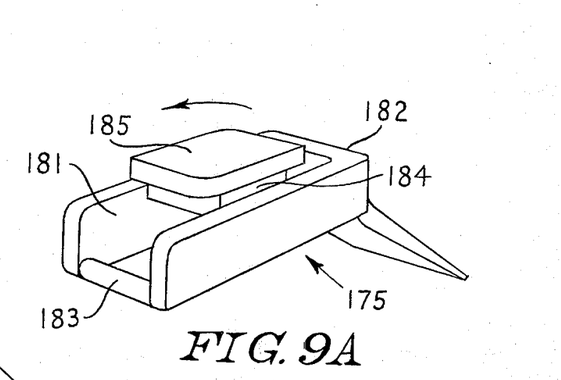

Referring now to FIGS. 9 and 9A, another form of hanger is there shown and is generally designated by the reference numeral 175 and is shown in FIG. 9 suspended from a channel 176. The channel 176 has front and rear portions 177 and a top portion 178 and inwardly projecting lips 179 spaced apart to provide a slot 180. The hanger 175 has side portions 181 and a rear portion 182. The front ends of the side portions 181 are connected by a rod 183 from which a tape reel is suspended. The side portions 181 are bridged by a bridge member 184 which is integral with a lock plate 185. The hanger 175 is inserted in the channel 176 by twisting the hanger so that the lock plate is longitudinally aligned with the slot 180 and since its width is less than that of the slot 180, the hanger may then be inserted and then twisted back to the position shown in FIG. 9.

Figure 10:
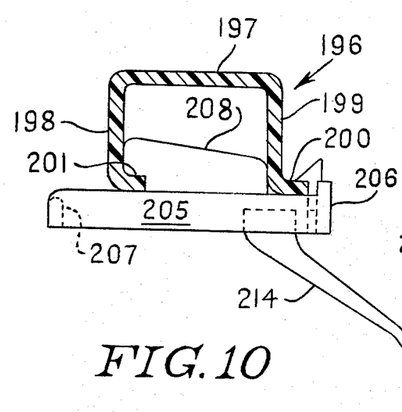
Figure 10A:
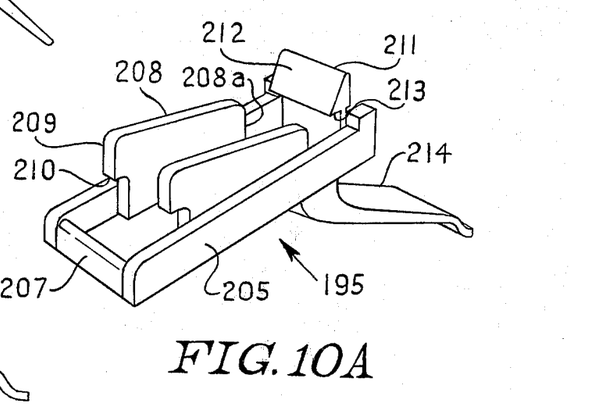

Referring now to FIGS. 10 and 10A a hanger 195 is there shown suspended from a channel 196. The channel 196 has a top portion 197, a front portion 198 and a rear portion 199. The rear portion 199 has a rearwardly projecting lip 200 and the front portion 198 has a rearwardly projecting lip 201. The hanger 195 has side portions 205 connected at the rear by a member 206. At its forward end the side portions 205 are connected by a rod 207 from which a tape reel is suspended. Members 208 project up from the side members 205 each having a forward extension 209 which form a shoulder 210. At the rear of the hanger is a lock member 211 formed with a cam surface 212 terminating at its lower end in a shoulder 213. A spring member 214 is provided. The rear portions 208a of members 208 abut the rear 199 of channel 196 and act to hold the hanger in place.

Referring to FIG. 10, the hanger 195 is inserted by canting it in clockwise direction (as viewed in FIG. 10) from the position shown in FIG. 10 until the tongues 209 can be inserted into the channel 196 and overly the lip 201. Then the hanger is rotated back to its normal horizontal position shown in FIG. 10 at which time the cam surface 212 will act to flex the lock member all to the right as viewed in FIG. 10 until the cam portion 212 clears the lip 200 and the shoulder 213 engages the upper edge of the lip.

Figures 11, 11A:
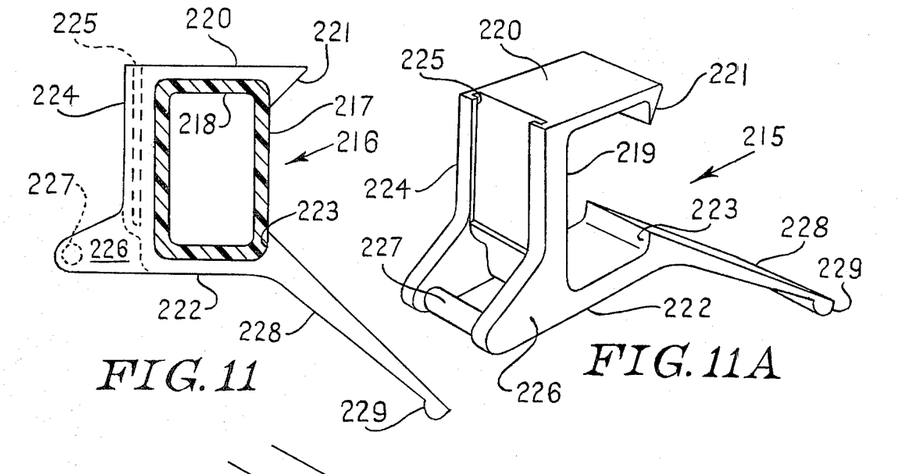

Referring now to FIGS. 11 and 11A another form of hanger is thereshown and is generally designated by the reference numeral 215. It is shown suspended from a simple tube 216 having side portions 217 and top and bottom portions 218. The hanger 215 has a front body portion 219 and a top portion 220 formed with a downwardly projecting lip 221. The hanger also has a bottom portion 222 formed with an upwardly projecting lip 223. The front portion 219 is formed with forward extensions 224 which provide slots 225 for insertion of coding or indexing means and it is also formed as its lower end with extensions 226 between which extends a rod 227 from which a tape reel is suspended. Also shown is a spring member 228 terminating in a bead or tip 229. The device of FIGS. 11 and 11A is a wrap-around device which is mounted on a tube by slipping it on an end of the tube if end access is available or by spreading the upper and lower portions apart manually sufficiently to allow the lips 221 and 223 to clear the upper and lower portions of the beam 216. The hanger is then thrust rearward until the lips 221 and 223 snap over the rear of the tube 216 beam.

Figure 12:
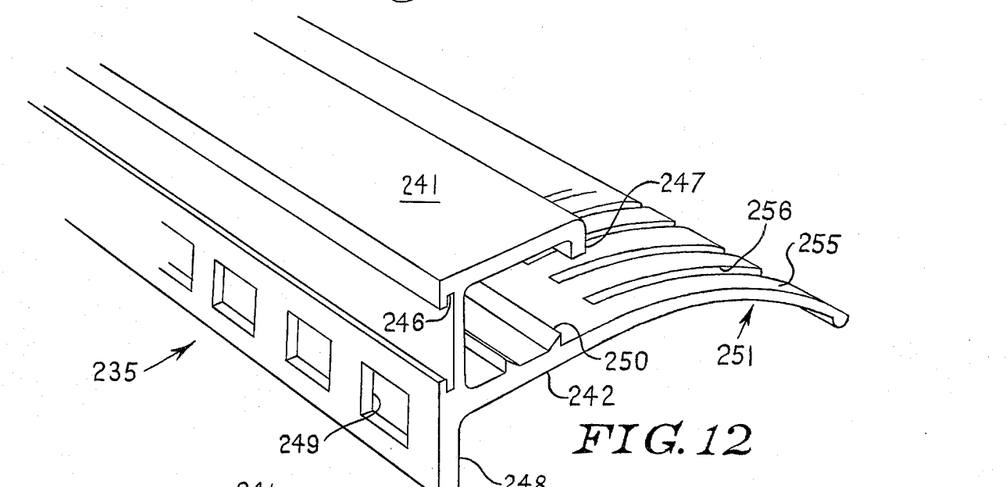
FIG. 12 is a perspective view of yet another form of hanger which is an extruded plastic, is a multiple hanger and also provides an individual spring action for damping the swinging of each tape reel.
Figure 12A:
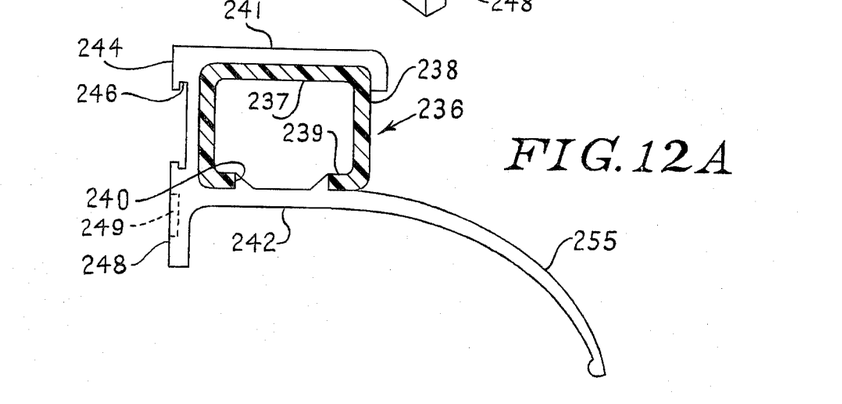
FIG. 12A is a view in an elevation showing the hanger of FIG. 12 suspended from a supporting channel.

Referring now to FIGS. 12 and 12A, a different type of a hanger is shown which is an extruded plastic multiple hanger made integral rather than of individual hangers as illustrated in FIG. 1 to 11A. This hanger is generally designated by the reference numeral 235 and is shown suspended from a channel 236. The channel 236 has an upper portion 237, front and rear side portions 238 and inwardly projecting lips 239 spaced apart to provide a slot 240. The hanger 235 has a top portion 241, a bottom portion 242 and a front portion 243 formed with extensions 244 which provide grooves or slots 246 within which indicia or indexing means may be located. The front portion has a downward extension 248 formed with slots 249 from which reels can be hung. Spaced ribs 250 are provided in the bottom portion 242 and a comb structure 251 is provided extending to the rear which is cut or molded from a solid piece of plastic material integral with the remainder of the hanger so as to provide individual spring members 255 separated by slots 256 which are cut in the plastic after the hanger is molded. The manner in which the hanger 235 is suspended from the channel 236 will be evident from an inspection of FIG. 12A. Thus if access to an end of the channel 236 is unavailable or is inconvenient the bottom portion 242 and comb 249 will be deflected downwardly and the top portion 241 will be deflected upwardly until the lip 247 and the rib 250 clear the respective outer surfaces of the channel and the hanger is then thrust forwardly until the lip 247 snaps over the rear wall of the beam and the ribs 250 snap into the slot 240.

The hanger of FIGS. 12 and 12A does not provide the flexibility and easy replacement of individual hangers that are provided by the hangers of FIGS. 1 to 11A, but it does provide an individual spring for each reel.

It will therefore be apparent that new and useful apparatus is provided for hanging tape reels and the like.

I claim:

1. A hanger of integral molded plastic construction comprising:
    a front portion slotted to receive indexing means and having at its lower end means for engaging a peripheral hook on a tape reel or the like, said means projecting forwardly of the area of said front portion which receives the indexing means,
    a pair of wings projecting rearwardly from opposite sides of said front portion,
    a resilient lock member located between said wings rearwardly of said front portion, said lock member having an upwardly sloping cam surface engageable with an edge of a slot in a supporting beam to cause flexing of the lock member as it is forced into such slot and to allow return of the lock member to its normal position when it has cleared the slot, such lock member serving in its normal position to secure the hanger in such slot when it has returned to its normal position and allowing manual flexing to remove the hanger from the beam, and
    a downwardly curving, resilient spring member to the rear of such lock member, such spring member serving to contact a swinging reel suspended from said rod and to damp swinging motion of the reel.

2. The hanger of claim 1 including an upwardly projecting extension of each wing serving to receive the thrust of the edges of a retaining slot in a supporting beam when the hanger is forced forwardly or rearwardly within such slot.

3. A hanger adapted to independently suspend a single disc-like reel having a width which is a small fraction of its diameter and having a circumferential closure with a peripheral hook, said hanger being of integral construction and having a width not substantially greater than the width of the reel to be suspended, said hanger comprising:
    a front portion to be exposed to view and front access when suspended, having means on said exposed front portion adapted to hold a label and to permit easy application of and removal of the label, and having an exposed horizontal member capable of receiving a hook and suspending an enclosed tape reel from the hook,
    a lock member to the rear of said front portion, said lock member being capable of insertion in and removal from a supporting beam in the form of a channel having a longitudinal slot, such insertion and removal being by entry into and withdrawl from such slot, such entry and withdrawl being possible without access to an end of the beam, said lock member being resilient and having a cam surface which engages an edge of said longitudinal slot and causes the lock member to flex while it is being inserted, said lock member flexing back to its normal position when inserted, serving in such normal position to lock the hanger in the supporting beam and allowing flexing by manual means when it is desired to remove the hanger from the beam, and
    a spring member to the rear of the lock member, said spring member being engageable with the rear of a suspended reel and serving to damp swinging motion of the reel when it is suspended and to swing the reel forwardly in response to a rearward push when the reel is to be removed.

4. A reel storage system for suspending disc-like reels side by side for compact storage and ready access, said system comprising;
    a storage frame having at least one elongated horizontal suspension means capable of suspending a plurality of reels side by side, and
    a plurality of suspension members carried by said suspension means in side by side relationship, one for each reel to be suspended, and each having a width not substantially greater than the width of the reel to be suspended or than the width of a canister containing such reel,
    each said suspension member having an exposed front portion including a hanger element capable of detachably receiving a suspension hook on a reel or canister and allowing swinging of the suspended reel,
    each said suspension member having on it exposed front portion a label holder for holding and for allowing insertion and removal of a label identifying the reel suspended from the suspension member,
    each said suspension member also having means for detachably securing it to the suspension means of such storage frame,
    each said suspension member also having at its rear an individual spring element which is separated from adjoining suspension members and which acts only on the reel suspended on the respective suspension member, such spring element acting to damp swinging of a reel when the reel is suspended and acting during removal of the suspended reel to swing the reel forwardly for ready access in response to a rearward push exerted manually on the reel.

5. A hanger adapted to independently suspend a single disc-like reel having a width which is a small fraction of its diameter, having a circumferential closure with a peripheral hook, said hanger being of integral construction and having a width not substantially greater than the width of the reel to be suspended, said hanger comprising:
    a front portion to be exposed to view and front access when suspended, sloping outwardly from the top, having means on said exposed front portion adapted to hold a label and to permit easy application of and removal of the label, and having an exposed horizontal member located at the bottom of said sloping front portion and capable of receiving a hook and suspending an enclosed tape reel from the hook,
    a lock member to the rear of said front portion, said lock member being engageable with and removable from a suspension beam to support the hanger from the beam, and
    a spring member to the rear of the lock member, said spring member being engageable with the rear of a suspended reel and serving to damp swinging motion of the reel when it is suspended and to swing the reel forwardly in response to a rearward push when the reel is to be removed.

6. A structure for suspending disc-like reels and the like each provided with a peripheral suspension hook, said structure comprising:

a suspension framework includng a horizontal beam and a plurality of individual hanger elements suspended from such beam, and movable therealong to any desired position, each said hanger element comprising, an exposed, forward portion sloping outwardly from the top and having hanger means for receiving a hook on a tape seal to suspend the reel and allow swinging thereof when suspended, said hanger means being located at the bottom of said sloping forward portion, and a lock member rearwardly of the said forward portion, said lock member being attachable to and removable from said beam and serving, while so attached, to secure the hanger to the beam and to permit horizontal movement of the hanger along the beam to any desired position, and a rear spring member acting only on the reel suspended by such hanger element to damp swinging movement thereof and to swing the suspended reel forwardly for access in response to a rearward push on the reel.

* * * * *